United States Patent [19]

Dufour

[11] Patent Number: 4,933,541
[45] Date of Patent: Jun. 12, 1990

[54] METHOD AND APPARATUS FOR ACTIVE VISION IMAGE ENHANCEMENT WITH WAVELENGTH MATCHING

[75] Inventor: Marc Dufour, Montreal, Canada

[73] Assignee: Canadian Patents and Development Ltd. - Societe Canadienne des Brevets et d'Exploitation Limitee

[21] Appl. No.: 373,066

[22] Filed: Jun. 29, 1989

[51] Int. Cl.⁵ .............................................. G05B 1/00
[52] U.S. Cl. .................................. 250/202; 250/226; 318/577; 219/124
[58] Field of Search ................ 250/202, 226; 356/376; 219/130.01, 124.34; 318/577

[56] References Cited

U.S. PATENT DOCUMENTS

| | | | |
|---|---|---|---|
| 3,694,092 | 9/1972 | Hashimoto et al. | 250/226 |
| 4,520,388 | 5/1985 | Kellie | 356/376 |
| 4,578,561 | 3/1986 | Corby, Jr. et al. | 219/124.34 |
| 4,587,414 | 5/1986 | Bohlander | 250/202 |
| 4,639,140 | 1/1987 | Lerat | 356/376 |
| 4,770,532 | 9/1988 | Ito | 356/376 |

Primary Examiner—David C. Nelms
Assistant Examiner—Que Tan Le
Attorney, Agent, or Firm—Foley & Lardner, Schwartz, Jeffery, Schwaab, Mack, Blumenthal & Evans

[57] ABSTRACT

A method and apparatus for optically inspecting the geometry of a surface in an environment which is subject to the presence of external light noise perturbations. A beam of monochromatic light having a predetermined wavelength and a structured light pattern is projected onto the surface to thereby scatter the structured light beam and produce a scattered light beam which is thereafter separated into first and second scattered beam portions. The first scattered beam portion is passed through a first optical filter having a narrow bandwidth and a central wavelength corresponding substantially to the wavelength of the projected light, thereby providing a first optical output signal representative of the surface geometry and of external light noise perturbation. The second scattered beam portion is passed through a second optical filter having a narrow wavelength bandwidth and a central wavelength which is closely spaced from the predetermined wavelength of the projected light by a wavelength offset such as to reject the projected light wavelength, thereby providing a second optical output signal representative of substantially the same external light noise perturbation as that passing through the first optical filter. The first and second optical output signals are detected and converted into first and second electrical signals, respectively. The second electrical signal is then subtracted from the first electrical signal to provide a substantially noise-free electrical output signal representative of the surface geometry. The invention is particularly useful for active vision robot welding and enables arc light noise-free images to be obtained in real time.

20 Claims, 3 Drawing Sheets

METHOD AND APPARATUS FOR ACTIVE VISION IMAGE ENHANCEMENT WITH WAVELENGTH MATCHING

BACKGROUND OF THE INVENTION

The present invention relates to a method and apparatus for active vision image enhancement. More particularly, the invention is directed to a double spectral image sensing method and apparatus for active vision robot welding and surface inspection.

Visual inspection systems are required for quality control and process monitoring in a wide variety of industrial applications. Increasing demand is developping for noncontact, nondestructive, nonperturbating, fast, reliable and moderate-cost inspection systems for use in harsh environmental conditions, such as in the presence of external light noise perturbations, high temperature, smoke, dust and water vapor. For many applications, active vision offers significant advantages over other techniques since it facilitates adaptive behavior using relatively simple image analysis.

The ability of any active vision system to reject foreign light source perturbation is crucial and is a definite cause of problem for applications such as in robot arc welding where the arc light is very intense and constitutes a strong perturbation for active vision of seam welding. Many systems are known which are capable of extirpating useful signals in such harsh conditions. These systems are generally based on the projection of a structured light beam on the joint to be welded, using laser diodes or the like. When viewed at an angle, the projected light takes the shape of the seam and thus provides an image of the seam profile. Simple algorithma are then used to extract the information needed to synchronize the robot movements and the displacements of the torch from these images. Real time operation is mandatory and the simpler the algorithms are, the lesser computer power will be required, resulting in lower cost and more efficient systems. It is very important to submit high quality, noise-free images to the image processor to avoid slow and costly computer discriminating techniques.

Currently available active vision systems generally use a video camera and an optical filter which is placed in front of the camera and which has a central wavelength corresponding to the wavelength of the monochromatic light projected on the surface to be inspected. Because foreign light noise is generally spread over a broad spectrum, it is possible to reject most of the foreign light noise by selecting an optical filter having a narrow band to thereby increase the visibility of the projected light over the background light noise and to thus facilitate image processing. But for light noise emitters such as a welding torch, there is still enough light noise intensity within the band of the optical filter to disturb considerably the quality of the image.

Narrow band optical filters, however, have a limited efficiency in rejecting foreign light noise since it is not practically possible to reduce the bandwidth of such filters under about 2-10 nanometers depending on the optical design. A narrow band optical filter such as in interference filter is temperature dependent and thus the reduction of its bandwidth will require greater temperature stability. Moreover, the effective bandwidth and central wavelength of an interference filter is dependent upon the angle of incidence of the light. The effect becomes increasingly disturbing as the bandwidth of the filter is reduced.

On the other hand, the use of a powerfull projected light source such as a powerfull laser will contribute to increasing the predominance of the desired signal over noise and thus improving the quality of the image. However, the intensity of the projected light will rapidly become unsafe for eyes when used in an area where human operators are standing by. Also, the cost of such a powerfull laser will be prohibitive.

SUMMARY OF THE INVENTION

It is therefore an object of the present invention to overcome the above drawbacks and to provide a method and apparatus enabling active vision image enhancement.

According to one aspect of the invention, there is thus provided a method of optically inspecting the geometry of a surface in an environment which is subject to the presence of external light noise perturbations. The method of the invention comprises the steps of:

(a) projecting a beam of monochromatic light having a predetermined wavelength and a structured light pattern onto the surface to be inspected, to thereby scatter the structured light beam and produce a scattered light beam;

(b) separating the scattered light beam into first and second scattered beam portions;

(c) passing the first scattered beam portion through a first optical filter having a narrow bandwidth and a central wavelength corresponding substantially to the wavelength of the projected light, thereby providing a first optical output signal representative of the surface geometry and of external light noise perturbation;

(d) passing the second scattered beam portion through a second optical filter having a narrow bandwidth and a central wavelength which is closely spaced from the wavelength of the projected light by a wavelength offset such as to reject the projected light wavelength, thereby providing a second optical output signal representative of substantially the same external light noise perturbation as that passing through the first optical filter;

(e) detecting the first and second optical output signals and converting same into first and second electrical signals, respectively; and (f) subtracting the second electrical signal from the first electrical signal to provide a substantially noise-free electrical output signal representative of the surface geometry.

The present invention also provides, in another aspect thereof, an apparatus for carrying out a method as defined above. The apparatus of the invention comprises structured monochromatic light source means for generating a beam of monochromatic light having a predetermined wavelength with a structured light pattern and projecting same onto the surface to be inspected, to thereby scatter the structured light beam and produce a scattered light beam, and beam splitting means for separating the scattered light beam into first and second scattered beam portions travelling along respective optical paths. A first optical filter having a narrow bandwidth and a central wavelength corresponding substantially to the wavelength of the projected light is arranged in the optical path of the first scattered beam portion to provide a first optical output signal representative of the surface geometry and of external light noise perturbation. A second optical filter having a narrow bandwidth and a central wavelength which is closely spaced from the wavelength of the projected light by a wavelength offset such as to reject the projected light wavelength, is arranged in the optical path of the second scattered beam portion to provide a second optical output signal representative of substantially the same external light noise perturbation as that passing through the first optical filter. First and second detector means are provided for detecting the first and second optical output signals and converting same into first and second electrical signals, respectively. A subtracting circuit is connected to the first and second detector means for substracting the second electrical signal from the first electrical signal to provide a substantially noise-free electrical output signal representative of the surface geometry.

Applicant has found quite unexpectedly that by using two narrow band optical filters arranged in the respective optical paths of the scattered beam portions produced by a beam splitter, one optical filter having a central wavelength corresponding substantially to the wavelength of the projected light and the other optical filter having a central wavelength closely spaced from the wavelength of the projected light by a wavelength offest such as to reject the projected light wavelength, and by subtracting the signals derived from these optical filters, it is possible to obtain a substantially noise-free output signal representative of the geometry of the surface undergoing inspection.

According to a preferred embodiment of the invention, the first and second optical filters have substantially the same bandwidth such that the quantity of light noise passing through each filter is substantially the same. Slight differences in the bandwidths of the optical filters can be compensated for by means of two separate amplifiers connected between the detectors and the subtracting circuit, which amplifiers serve to adjust the relative sensitivity of the detectors and to properly balance the amplitude of the electrical signals from the detectors. Preferably, the second optical filter has a central wavelength closely spaced from the wavelength of the projected light by a wavelength offset which is substantially equal to the bandwidth of both optical filters.

The optical filters preferably used comprise interference filters having a bandwidth ranging from about 2 to about 10 nanometers.

The method and apparatus according to the invention are particularly useful for active vision robot welding and enable arc light noise-free images to be obtained in real time.

BRIEF DESCRIPTION OF THE DRAWINGS

Further features and advantages of the invention will become more readily apparent from the following description of preferred embodiments with reference to the accompanying drawings, in which.

DESCRIPTION OF PREFERRED EMBODIMENTS

Figure 1:
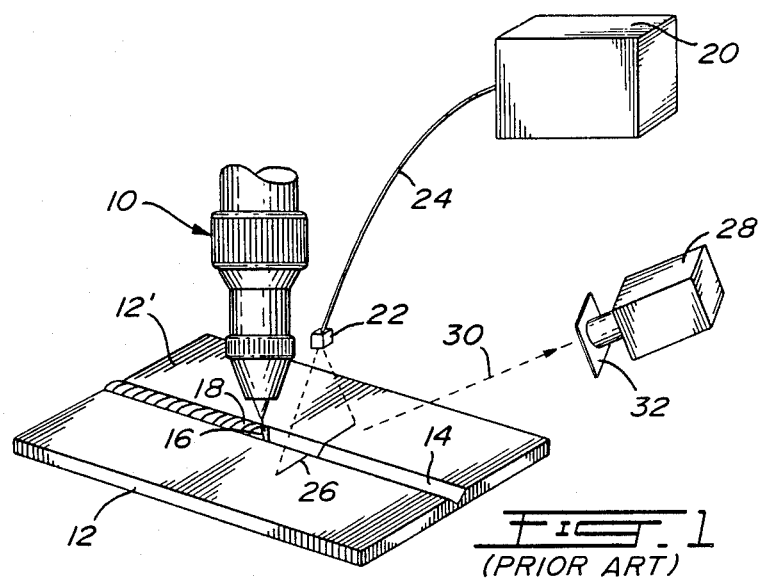
FIG. 1 schematically illustrates an active vision system according to the prior art, as used for real-time arc-welding process control and seam tracking.

Referring first to FIG. 1, there is illustrated a typical active vision system according to the prior art, for real-time arc-welding process control and seam tracking. As shown, a welding torch 10 is positioned above two workpiece members 12 and 12' to be joined and is adapted to perform root pass welding of the open butt joint 14 defined between the two workpiece members 12,12'. The welding torch 10 is operative to discharge an electric arc 16, thereby forming a weldpool 18 penetrating the joint. In order to provide precise seam profile measurement, a monochromatic light source 20 such as a laser diode, optically coupled to an optical projection unit 22 by means of a glass fiber optical waveguide 24, is used to project a laser line 26 onto the surface of the workpiece members 12,12'; although the structured light pattern 26 illustrated is a line, such a light pattern may also be a simple dot, a mechanically scanned dot or a more sophisticated pattern. A video camera 28 such as a CCD (Charged Coupled Device) camera is positioned to view the light scattered by the surface, the scattered light being represented in the form of a scattered laser beam 30. An interference filter 32 placed in front of the camera 28 is used for light noise rejection. Such a system, however, has limited application since the electric arc 16 generated by the welding torch 10 still provides enough light noise intensity with the band of the filter 32 to disturb considerably the quality of the image viewed by the camera 28.

Figure 2:
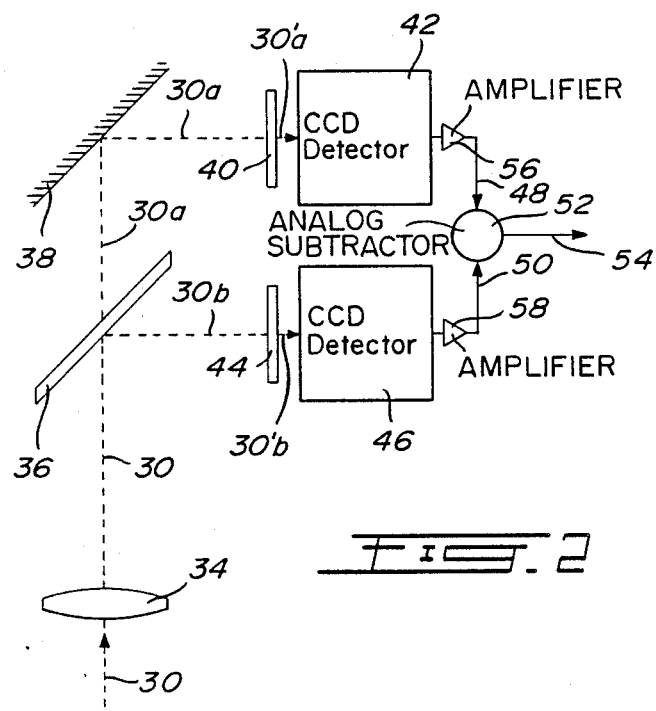
FIG. 2 is a schematic diagram of an apparatus according to a preferred embodiment of the invention.

FIG. 2 schematically illustrates how efficient light noise rejection can be achieved in accordance with the invention. To this end, the scattered laser beam 30 is passed through a focussing lens 34 and directed onto a 50%—50% beam splitter 36 which separates the scattered beam 30 into two scattered beam portions 30a and 30b. The beam portion 30a is reflected by a back-reflective mirror 38 and directed through an optical interference filter 40 and onto a CCD detector 42. Similarly, the beam portion 30b is directed through an optical interference filter 44 and onto a CCD detector 46. The interference filters 40 and 44 have substantially the same bandwidth which typically ranges from about 2 to about 10 nanometers. However, the filter 40 has a central wavelength corresponding substantially to the wavelength of the laser diode 20, whereas the filter 44 has a central wavelength which is closely spaced from the wavelength of the laser diode by a wavelength offset such as to reject the laser wavelength. Thus, the filtered beam portion 30'a defines an optical output signal representative of the seam profile and of light noise perturbation, whereas the filtered beam portion 30'b defines an optical output signal representative of substantially the same light noise perturbation as that passing through the filter 40. The optical output signals 30'a and 30'b are converted by the detectors 42 and 46 into corresponding electrical signals 48 and 50 which are fed to an analog subtractor 52 which is operative to subtract the signal 50 from the signal 48 and to thereby provide a substantially noise-free electrical output signal 54 representative of the seam profile. The output signal 54 is then fed to an image processor (not shown).

Since the sensitivities of the detectors 42 and 46 are generally not exactly the same and also because the interference filters 40 and 44 generally show different transmissivity values, two separate amplifiers 56 and 58 are used to balance the amplitude of the signals 48 and 50.

The mirror 38 which is arranged in the optical path of the beam portion 30a is used to provide a reflected beam portion having the same spatial distribution as the beam portion 30b. However, when use is made of linear CCD-detectors 42 and 46, such a mirror can be eliminated.

Figure 3:
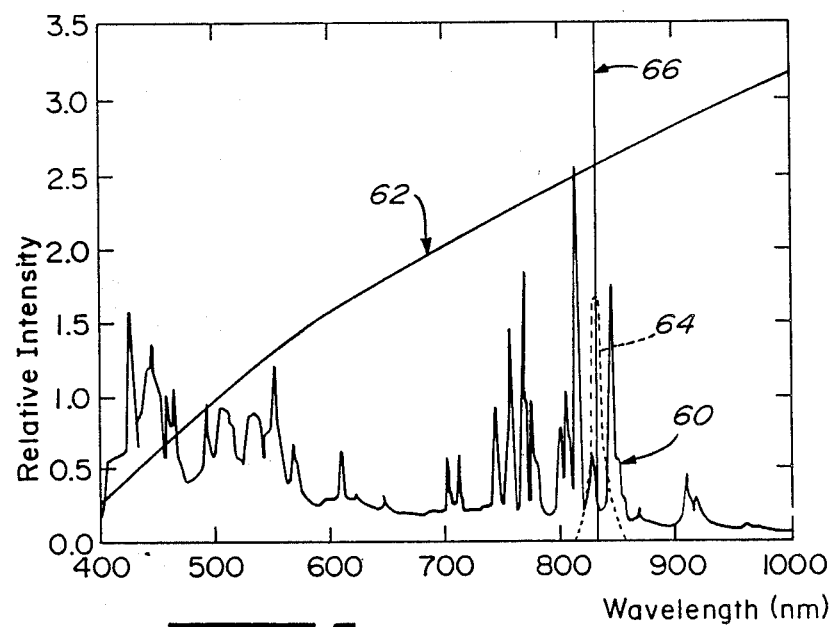
FIG. 3 is a graph illustrating the spectral characteristics of an interference filter used to eliminate the light noise generated by a typical electric arc.

FIG. 3 illustrates the spectrum 60 of the light emitted by a typical electric arc as well as the spectrum 62 of a spatter, that is, a molten metal particle. Also shown is the spectral response 64 of a typical interference filter centered on the spectral line 66 of a laser diode.

Figure 4:
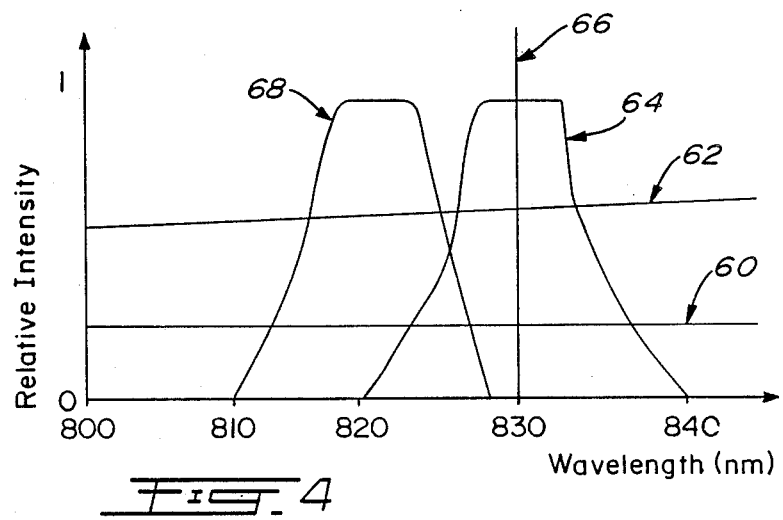
FIG. 4 is a graph illustrating the spectral characteristics of two interference filters used in accordance with the invention to eliminate the light noise generated by an electric arc.

FIG. 4 is a graph similar to FIG. 3 with the exception that the spectral response 68 of an additional interference filter is shown and that the scalling has been increased to show details in the spectral range of the wavelength of the laser line 66. The spectral responses 64 and 68 are typically those of the interference filters 40 and 44, respectively. As may be seen, the spectral response 68 of the second filter 44 has a central wavelength (i.e. about 820 nanometers) which is closely spaced from the wavelength (i.e. about 830 nanometers) of the laser line 66 by a wavelength offset of about 10 nanometers such as to reject the laser wavelength. The spectral responses 64 and 68 also exhibit substantially the same bandwidth. Thus, the light noise passing through each filter is substantially the same in terms of both quantity and signal content.

Figure 5A:
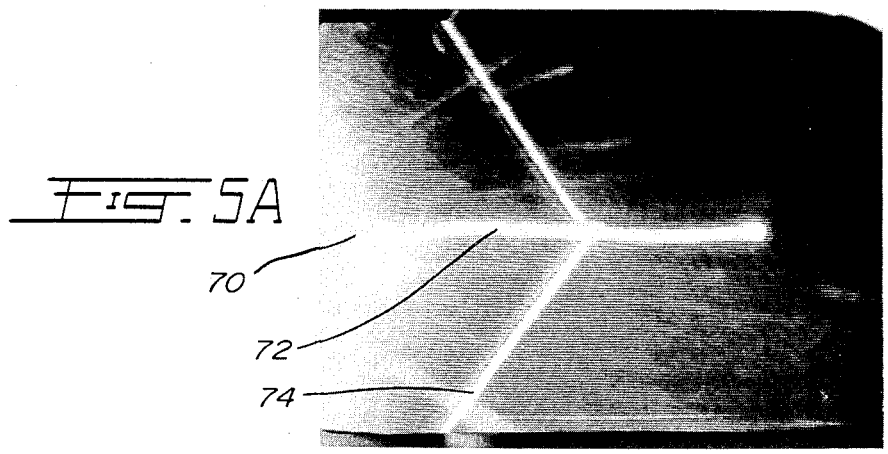
FIGS. 5A, 5B and 5C are photographs showing respectively the images typically detected by the two detectors of the apparatus illustrated in FIG. 2, when used for active vision robot welding, and the image after noise cancellation (subtraction).
Figure 5B:
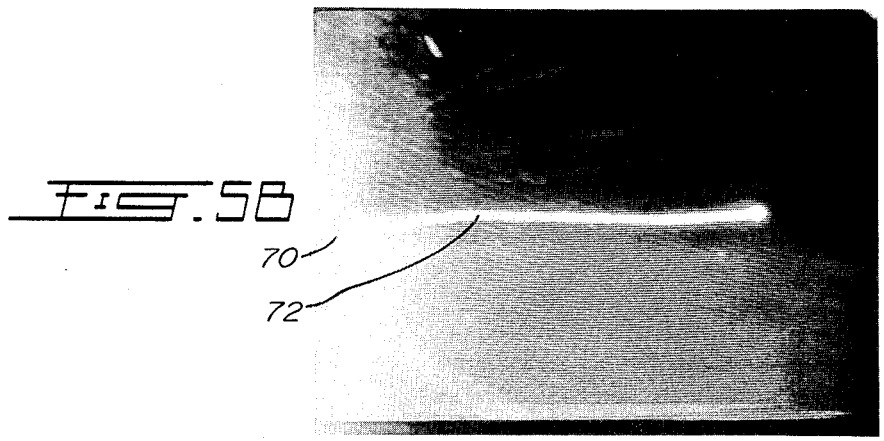
Figure 5C:
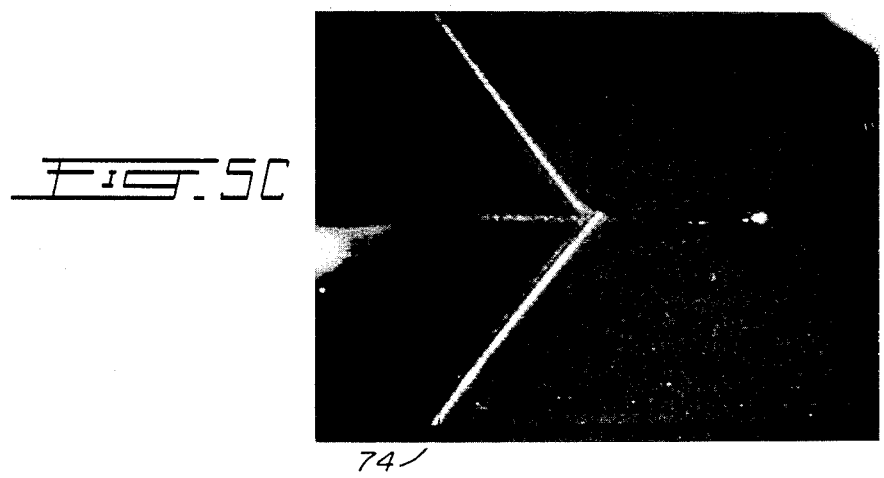

FIG. 5A illustrated the image as typically detected by the detector 42; shown in this image are the arc light noise 70, the light noise 72 emitted by a spatter and the scattered laser light 74 representative of the seam profile. FIG. 5B illustrates the image as typically detected by the detector 46; shown in this image are the arc light noise 70 and the spatter light noise 72. FIG. 5C illustrates the image derived from the electrical output signal 54 following subtraction of the electrical signal 50 from the electrical signal 48. As may be seen from FIG. 5C, the image is substantially noise-free.

I claim:

1. A method of optically inspecting the geometry of a surface in an environment which is subject to the presence of external light noise perturbations, which comprises the steps of:
   (a) projecting a beam of monochromatic light having a predetermined wavelength and a structured light pattern onto said surface to thereby scatter the structured light beam and produce a scattered light beam;
   (b) separating said scattered light beam into first and second scattered beam portions;
   (c) passing said first scattered beam portion through a first optical filter having a narrow bandwidth and a central wavelength corresponding substantially to said predetermined wavelength, thereby providing a first optical output signal representative of the surface geometry and of external light noise perturbation;
   (d) passing said second scattered beam portion through a second optical filter having a narrow bandwidth and a central wavelength which is closely spaced from said predetermined wavelength by a wavelength offset such as to reject said predetermined wavelength, thereby providing a second optical output signal representative of substantially the same external light noise perturbation as that passing through said first optical filter;
   (e) detecting said first and second optical output signals and converting same into first and second electrical signals, respectively; and
   (f) subtracting said second electrical signal from said first electrical signal to provide a substantially noise-free electrical output signal representative of said surface geometry.

2. A method as claimed in claim 1, wherein step (a) is carried out by means of a laser diode optically coupled to an optical projection unit for projecting a structured laser beam onto said surface.

3. A method as claimed in claim 1, wherein step (b) is carried out by means of a 50%—50% beam splitter.

4. A method as claimed in claim 1, wherein said first and second optical filters comprise interference filters having a bandwidth ranging from about 2 to about 10 nanometers.

5. A method as claimed in claim 1, wherein said first and second optical filters have substantially the same bandwidth.

6. A method as claimed in claim 5, wherein said second optical filter has a central wavelength closely spaced from said predetermined wavelength by a wavelength offset which is substantially equal to the bandwidth of both said filters.

7. A method as claimed in claim 1, wherein step (e) is carried out by means of two separate CCD-type detectors.

8. A method as claimed in claim 7, wherein said first and second scattered beam portions are focussed through said first and second optical filters and onto said detectors.

9. A method as claimed in claim 7, wherein said first scattered beam portion is directed onto a mirror to produce a reflected beam portion which is thereafter directed through said first optical filter and onto one of said detectors.

10. A method as claimed in claim 7, wherein step (e) is carried out by means of an analog subtracting circuit connected to said detectors.

11. An apparatus for optically inspecting the geometry of a surface in an environment which is subject to the presence of external light noise perturbations, which comprises:
   structured monochromatic light source means for generating a beam of monochromatic light having a predetermined wavelength with a structured light pattern and projecting same onto said surface to thereby scatter the structured light beam and produce a scattered light beam;
   beam splitting means for separating said scattered light beam into first and second scattered beam portions travelling along respective optical paths;
   a first optical filter having a narrow bandwidth and a central wavelength corresponding substantially to said predetermined wavelength, said first optical filter being arranged in the optical path of said first scattered beam portion to provide a first optical output signal representative of the surface geometry and of external light noise perturbation;
   a second optical filter having a narrow bandwidth and a central wavelength which is closely spaced from said predetermined wavelength by a wavelength offset such as to reject said predetermined wavelength, said second optical filter being arranged in the optical path of said second scattered beam portion to provide a second optical output signal representative of substantially the same external light noise perturbation as that passing through said first optical filter;

first and second detector means for detecting said first and second optical output signals and converting same into first and second electrical signals, respectively; and a subtracting circuit connected to said first and second detector means for subtracting said second electrical signal from said first electrical signal to provide a substantially noise-free electrical output signal representative of said surface geometry.

12. An apparatus as claimed in claim 11, wherein said structured monochromatic light source means comprises a laser diode optically coupled to an optical projection unit for projecting a structured laser beam onto said surface.

13. An apparatus as claimed in claim 11, wherein said beam splitting means comprises a 50%—50% beam splitter.

14. An apparatus as claimed in claim 11, wherein said first and second optical filters comprise interference filters having a bandwidth ranging from about 2 to about 10 nanometers.

15. An apparatus as claimed in claim 11, wherein said first and second optical filters have substantially the same bandwidth.

16. An apparatus as claimed in claim 15, wherein said second optical filter has a central wavelength closely spaced from said predetermined wavelength by a wavelength offset which is substantially equal to the bandwidth of both said filters.

17. An apparatus as claimed in claim 11, further including optical lens means for focussing said first and second scattered beam portions through said first and second optical filters and onto said first and second detector means.

18. An apparatus as claimed in claim 11, further including a mirror arranged in the optical path of said first scattered beam portion between said beam splitting means and said first optical filter for producing a reflected beam portion directed through said first optical filter and onto said first detector means.

19. An apparatus as claimed in claim 11, wherein said first and second detector means each comprise a CCD-type detector.

20. An apparatus as claimed in claim 11, wherein said subtracting circuit comprises an analog subtracting circuit.

* * * * *